(12) United States Patent
Wen et al.

(10) Patent No.: US 11,573,542 B2
(45) Date of Patent: Feb. 7, 2023

(54) METHOD AND APPARATUS FOR ADJUSTING PROCESS CONTROL PREDICTION MODEL AND PROCESS CONTROLLER

(71) Applicant: Siemens Aktiengesellschaft, Munich (DE)

(72) Inventors: Bo Wen, Beijing (CN); Zhu Niu, Chao yang (CN); Shun Jie Fan, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 82 days.

(21) Appl. No.: 17/259,672

(22) PCT Filed: Jul. 13, 2018

(86) PCT No.: PCT/CN2018/095685
§ 371 (c)(1),
(2) Date: Jan. 12, 2021

(87) PCT Pub. No.: WO2020/010629
PCT Pub. Date: Jan. 16, 2020

(65) Prior Publication Data
US 2021/0232106 A1    Jul. 29, 2021

(51) Int. Cl.
*G05B 13/04* (2006.01)
(52) U.S. Cl.
CPC ......... *G05B 13/048* (2013.01); *G05B 13/041* (2013.01); *G05B 13/047* (2013.01)
(58) Field of Classification Search
CPC .. G05B 13/048; G05B 13/041; G05B 13/047; G05B 17/02
See application file for complete search history.

(56) References Cited

U.S. PATENT DOCUMENTS

| | | | |
|---|---|---|---|
| 2002/0040250 A1* | 4/2002 | Gaikwad | G05B 13/042 700/39 |
| 2004/0117766 A1* | 6/2004 | Mehta | G05B 11/32 717/121 |

(Continued)

FOREIGN PATENT DOCUMENTS

| | | |
|---|---|---|
| CN | 1940780 A | 4/2007 |
| CN | 101349893 A | 1/2009 |

(Continued)

OTHER PUBLICATIONS

International Search Report dated Jul. 13, 2018.

*Primary Examiner* — Christopher E. Everett
(74) *Attorney, Agent, or Firm* — Harness, Dickey & Pierce, P.L.C.

(57) ABSTRACT

The present disclosure provides a method and an apparatus for adjusting a process control prediction model, and a process controller. In an embodiment, the method includes: determining, based on controlled variable data in process control data obtained through real-time monitoring, whether a prediction performance of the process control prediction model is lower than a reference performance; and when the prediction performance is determined to be lower than the reference performance, using manipulated variable data in the process control data monitored to adjust the process control prediction model. By way of the method, a re-test does not need to be executed to re-identify a model so as to eliminate a mismatch of the process control prediction model, thereby eliminating an influence of fluctuation introduced by addition of an excitation signal during the re-testing.

16 Claims, 11 Drawing Sheets

(56) References Cited

U.S. PATENT DOCUMENTS

| | | | |
|---|---|---|---|
| 2007/0078529 A1 | 4/2007 | Thiele et al. | |
| 2008/0052039 A1* | 2/2008 | Miller | G05B 17/02 |
| | | | 702/182 |
| 2009/0143872 A1 | 6/2009 | Thiele et al. | |
| 2009/0198350 A1* | 8/2009 | Thiele | G05B 17/02 |
| | | | 700/83 |
| 2013/0041482 A1* | 2/2013 | Badwe | G05B 13/042 |
| | | | 700/29 |
| 2014/0107993 A1* | 4/2014 | Cheng | G05B 17/02 |
| | | | 700/32 |

FOREIGN PATENT DOCUMENTS

| | | |
|---|---|---|
| CN | 101587328 A | 11/2009 |
| CN | 101807048 A | 8/2010 |
| CN | 103092074 A | 5/2013 |
| CN | 104793489 A | 7/2015 |
| CN | 105700358 A | 6/2016 |

\* cited by examiner

METHOD AND APPARATUS FOR ADJUSTING PROCESS CONTROL PREDICTION MODEL AND PROCESS CONTROLLER

PRIORITY STATEMENT

This application is the national phase under 35 U.S.C. § 371 of PCT International Application No. PCT/CN2018/095685 which has an International filing date of Jul. 13, 2018, which designated the United States of America, the entire contents of which are hereby incorporated herein by reference.

FIELD

This application generally relates to the field of process control, and in particular, to a method and apparatus for adjusting a process control prediction model and a process controller having the apparatus.

BACKGROUND

In the field of process control, a model predictive controller (Model Predictive Controller, MPC) is the most popular advanced process controller (Advanced Process Controller, APC), which has a dynamic model of the process. A future change trend of a manipulated variable (Manipulated Variable, MV) in the MPC controller is determined by carrying out an optimization to maximize benefits of a factory under manipulated constraints. Because the MPC controller has the advantage of global optimization, the MPC controller has been widely used in industrial production.

SUMMARY

However, an efficiency of the MPC controller depends heavily on an accuracy of a model. In recent years, many efforts have been made to make a system model identification process more efficient and accurate. However, the inventors have discovered that no matter how accurate the model is, the model will always be mismatched with the factory as conditions change. Therefore, the inventors have discovered that there will be prediction errors, and the efficiency of the MPC controller will be weakened, or fluctuations are even brought to the system.

In these cases, the existing MPC controller will try to eliminate the above mismatch by re-testing to re-identify the model. However, the inventors have discovered that no matter what kind of re-identification method (manually or automatically) and what kind of excitation signal (step test sequence or binary random sequence) are adopted, the normal production process will be affected.

In view of the above, the application provides a method and apparatus for adjusting a process control prediction model and a process controller having the apparatus. By utilizing the method and the apparatus, a performance of an MPC controller is continuously monitored and evaluated, and adjustment of a process control prediction model is automatically triggered when the performance of the MPC controller is evaluated to be lower than a reference performance, thereby eliminating the above mismatch without performing re-testing to re-identify the model, thus eliminating an influence of fluctuation caused by increasing an excitation signal during re-testing.

According to an embodiment of the application, there is provided a method for adjusting a process control prediction model, including: determining, based on controlled variable (Controlled Variable, CV) data in process control data obtained through real-time monitoring, whether a prediction performance of the process control prediction model is lower than a reference performance; and when the prediction performance is lower than the reference performance, using manipulated variable (Manipulated Variable, MV) data in the process control data monitored to adjust the process control prediction model.

According to another embodiment of the application, there is provided an apparatus for adjusting a process control prediction model, including: a model adjustment trigger judging unit configured to determine, based on controlled variable data in process control data obtained through real-time monitoring, whether a prediction performance of the process control prediction model is lower than a reference performance; and a model adjustment unit configured to, when the prediction performance is lower than the reference performance, use manipulated variable data in the process control data monitored to adjust the process control prediction model.

According to another embodiment of the application, there is provided a process controller, including: the apparatus for adjusting a process control prediction model as described above; and a process control prediction model storage apparatus configured to storage a process control prediction model.

According to another embodiment of the application, there is provided a computing device, including: one or more processors; and a memory coupled with the one or more processors, and configured to store an instruction which, when executed by the one or more processors, causes the processor to perform the method for adjusting a process control prediction model as described in an embodiment.

According to another embodiment of the application, there is provided a non-transitory machine-readable storage medium storing an executable instruction which, when executed, causes the machine to perform the method for adjusting a process control prediction model as described in an embodiment.

BRIEF DESCRIPTION OF THE DRAWINGS

The essence and advantages of the content of the present disclosure can be further construed with reference to the following accompanying drawings. In the accompanying drawings, similar components or features may have the same reference numerals.

REFERENCE NUMERALS

Figure 1:
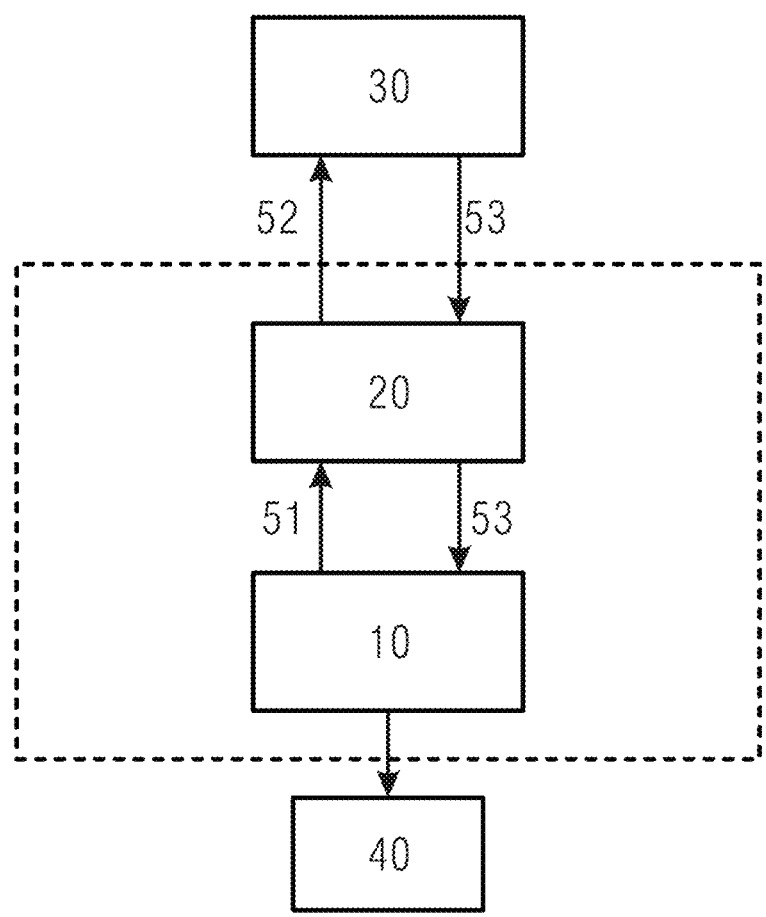
FIG. 1 shows a schematic diagram of a model re-identification process in the prior art.

10 refers to identification device
20 refers to testing device
30 refers to processing unit (DCS or PLC)
40 refers to model file
51 refers to excitation signal
52 refers to test signal
53 refers to MV/DV/CV data
1 refers to process controller
100 refers to model adjusting apparatus
200 refers to process control prediction model storage apparatus
110 refers to model adjustment trigger judging unit
120 refers to suitable data statistical period determining unit
130 refers to manipulated variable data selecting unit
140 refers to model adjustment unit
150 refers to model verification unit
160 refers to model updating unit
111 refers to standard variance calculation module
113 refers to model adjustment trigger judging module
141 refers to controlled variable prediction data acquisition module
143 refers to controlled variable actual data acquisition module
145 refers to model parameter adjustment module
S110 refers to monitoring a process control data in real time
S120 refers to determining whether a prediction performance of a process control prediction model is lower than a reference performance
S130 refers to, when the prediction performance is lower than the reference performance, using a manipulated variable data and a disturbance variable data in the process control data monitored to determine a process control data statistical period suitable for adjusting the process control prediction model
S200 refers to a process of adjusting the process control prediction model
S300 refers to a process of verifying the process control prediction model
S400 refers to a process of updating the process control prediction model
S210 refers to selecting manipulated variable data
S220 refers to acquiring controlled variable prediction data
S230 refers to acquiring controlled variable actual data
S240 refers to, based on the given manipulated variable data, the acquired controlled variable prediction data and the acquired controlled variable actual data, adjusting parameters of the current process control prediction model
S310 refers to selecting a manipulated variable input

S320-1 refers to generating a predicted value of the controlled variable based on the original process control prediction model
S320-2 refers to generating the predicted value of the controlled variable based on the original process control prediction model
S330 refers to calculating a standard variance of a controlled variable prediction error under each model
S340 refers to determining whether the performance of the adjusted process control prediction model exceeds a predetermined threshold?
1100 refers to computing device
1110 refers to one or more processors
1120 refers to memory

DETAILED DESCRIPTION OF THE EXAMPLE EMBODIMENTS

According to an embodiment of the application, there is provided a method for adjusting a process control prediction model, including: determining, based on controlled variable (Controlled Variable, CV) data in process control data obtained through real-time monitoring, whether a prediction performance of the process control prediction model is lower than a reference performance; and when the prediction performance is lower than the reference performance, using manipulated variable (Manipulated Variable, MV) data in the process control data monitored to adjust the process control prediction model.

Optionally, in an example of the above embodiment, the determining, based on the controlled variable data in the process control data obtained through real-time monitoring, whether the prediction performance of the process control prediction model is lower than the reference performance, may include: calculating a standard variance of a prediction error of the controlled variable data within a predetermined statistical period; and when the calculated standard variance is greater than a reference threshold, determining that the prediction performance is lower than the reference performance.

Optionally, in an example of the above embodiment, the adjusting the process control prediction model may include: acquiring controlled variable prediction data after a specified period predicted by the current process control prediction model under the condition of given manipulated variable data; acquiring controlled variable actual data after the specified period under the condition of the given manipulated variable data; and based on the given manipulated variable data, the acquired controlled variable prediction data and the acquired controlled variable actual data, adjusting parameters of the current process control prediction model.

Optionally, in an example of the above embodiment, the process control data further includes disturbance variable (Disturbance Variable, DV) data, and the method may further include: when the prediction performance is lower than the reference performance, using the manipulated variable data and the disturbance variable data in the process control data monitored to determine a process control data statistical period suitable for adjusting the process control prediction model; and selecting the given manipulated variable data from the process control data statistical period determined.

Optionally, in an example of the above embodiment, parameters of the process control prediction model include a gain, a steady-state time and a dead time, and the adjusting the parameters of the current process control prediction model may include: adjusting a gain of the current process control prediction model.

Optionally, in an example of the above embodiment, the method may further include: using the adjusted process control prediction model to update the process control prediction model in the process controller.

Optionally, in an example of the above embodiment, before the using the adjusted process control prediction model to update the process control prediction model in the process controller, the method may further include: verifying the prediction performance of the adjusted process control prediction model, and when it is verified that a prediction performance improvement degree of the adjusted process control prediction model does not exceed a predetermined threshold, re-adjusting the process control prediction model, or when it is verified that the prediction performance improvement degree of the adjusted process control prediction model exceeds the predetermined threshold, using the adjusted process control prediction model to update the process control prediction model in the process controller.

According to another embodiment of the application, there is provided an apparatus for adjusting a process control prediction model, including: a model adjustment trigger judging unit configured to determine, based on controlled variable data in process control data obtained through real-time monitoring, whether a prediction performance of the process control prediction model is lower than a reference performance; and a model adjustment unit configured to, when the prediction performance is lower than the reference performance, use manipulated variable data in the process control data monitored to adjust the process control prediction model.

Optionally, in an example of the above embodiment, the model adjustment trigger judging unit may include: a standard variance calculation module configured to calculate a standard variance of a prediction error of the controlled variable data within a predetermined statistical period; and a model adjustment trigger judging module configured to, when the calculated standard variance is greater than a reference threshold, determine that the prediction performance is lower than the reference performance.

Optionally, in an example of the above embodiment, the model adjustment unit may include: a controlled variable prediction data acquisition module configured to acquire controlled variable prediction data after a specified period predicted by the current process control prediction model under the condition of given manipulated variable data; a controlled variable actual data acquisition module configured to acquire controlled variable actual data after the specified period under the condition of the given manipulated variable data; and a model parameter adjustment module configured to, based on the given manipulated variable data, the acquired controlled variable prediction data and the acquired controlled variable actual data, adjust parameters of the current process control prediction model.

Optionally, in an example of the above embodiment, the process control data further includes disturbance variable data, and the apparatus may further include: a suitable data statistical period determining unit configured to, when the prediction performance is lower than the reference performance, use the manipulated variable data and the disturbance variable data in the process control data monitored to determine a process control data statistical period suitable for adjusting the process control prediction model; and a manipulated variable data selecting unit configured to select the given manipulated variable data from the process control data statistical period determined.

Optionally, in an example of the above embodiment, parameters of the process control prediction model include a gain, a steady-state time and a dead time, and the model parameter adjustment module is configured to: adjust a gain of the current process control prediction model.

Optionally, in an example of the above embodiment, the apparatus may further include: a model updating unit configured to use the adjusted process control prediction model to update the process control prediction model in the process controller.

Optionally, in an example of the above embodiment, the apparatus may further include: a model verification unit configured to, before the using the adjusted process control prediction model to update the process control prediction model in the process controller, verify the prediction performance of the adjusted process control prediction model, and when the model verification unit verifies that a prediction performance improvement degree of the adjusted process control prediction model does not exceed a predetermined threshold, re-adjusting, by the model adjustment unit, the process control prediction model, or when the model verification unit verifies that the prediction performance improvement degree of the adjusted process control prediction model exceeds the predetermined threshold, using, by the model updating unit, the adjusted process control prediction model to update the process control prediction model in the process controller.

According to another embodiment of the application, there is provided a process controller, including: the apparatus for adjusting a process control prediction model as described above; and a process control prediction model storage apparatus configured to storage a process control prediction model.

According to another embodiment of the application, there is provided a computing device, including: one or more processors; and a memory coupled with the one or more processors, and configured to store an instruction which, when executed by the one or more processors, causes the processor to perform the method for adjusting a process control prediction model as described in an embodiment.

According to another embodiment of the application, there is provided a non-transitory machine-readable storage medium storing an executable instruction which, when executed, causes the machine to perform the method for adjusting a process control prediction model as described in an embodiment.

By utilizing the method, the apparatus and the process controller according to an embodiment of the application, the performance of the MPC controller is continuously monitored and evaluated, and the adjustment of the process control prediction model is automatically triggered when the performance of the MPC controller is evaluated to be lower than the reference performance, thereby eliminating the above mismatch without performing re-testing to re-identify the model, thus eliminating the influence of fluctuation caused by increasing the excitation signal during re-testing.

By utilizing the method, the apparatus and the process controller according to an embodiment of the application, the model adjustment trigger judgment is carried out by calculating the standard variance of the prediction error of the controlled variable data within the predetermined statistical period, which can improve an accuracy of the model adjustment trigger judgment, thereby greatly reducing a mistaken trigger situation of the model adjustment.

By utilizing the method, the apparatus and the process controller according to an embodiment of the application, when the prediction performance is lower than the reference performance, the process control data statistical period suitable for adjusting the process control prediction model adjustment is determined by using the manipulated variable data and disturbance variable data in the process control data monitored, and the given manipulated variable data is selected from the process control data statistical period determined, so that the manipulated variable data used in the process control prediction model adjustment is more accurate, thereby improving an adjusting accuracy of the process control prediction model.

By utilizing the method, the apparatus and the process controller according to an embodiment of the application, after adjusting the process control prediction model, the adjusted process control prediction model is used to update the process control prediction model stored in the process controller, so that the process controller can use the adjusted process control prediction model to perform process prediction, thereby improving a prediction accuracy rate of the process controller.

By utilizing the method, the apparatus and the process controller according to an embodiment of the application, and through executing the process control prediction model verification process before updating the process control prediction model stored in the process controller with the adjusted process control prediction model, it can be ensured that the above-mentioned update will be carried out only after the prediction performance improvement degree of the adjusted process control prediction model reaches a desired level, so that the process control prediction model in the process controller can be optimized to meet expected requirements of users.

A subject described in this specification is discussed now with reference to exemplary implementations. It should be understood that, discussion of these implementations is merely intended to make a person skilled in the art better understand and implement the subject described in this specification, and is not intended to limit the protection scope of the claims, the applicability, or examples. Changes may be made to the functions and arrangements of the discussed elements without departing from the protection scope of the content of the disclosure. Various processes or components may be omitted, replaced, or added in each example according to requirements. For example, the described method may be performed according to a sequence different from the sequence described herein, and steps may be added, omitted or combined. In addition, features described in some examples may also be combined in other examples.

As used in this specification, the term "include" and variants thereof represent open terms, and means "include but is not limited to". The term "based on" represents "at least partially based on". The terms "one embodiment" and "an embodiment" represent "at least one embodiment". The term "another embodiment" represents "at least one another embodiment". The terms "first", "second" and the like may represent different objects or the same object. Other definitions may be included explicitly or implicitly. Unless otherwise clearly specified, the definition of one term is consistent in the entire specification.

FIG. 1 shows a schematic diagram of a model re-identification process in the prior art. As shown in FIG. 1, an identification device 10 sends an excitation signal 51 to a testing device 20. The testing device 20 generates a test signal 52 based on the received excitation signal 51 and sends the test signal 52 to a process processing unit (DCS or PLC) 30. The process processing unit 30 generates MV/DV/CV data 53 based on the received test signal 52 and sends the generated MV/DV/CV data 53 to the testing device 20. The testing device 20 then sends the MV/DV/CV data 53 to the identification device 10. The identification device 10 generates a new process control prediction model based on the MV/DV/CV data 53, and synchronizes the generated process control prediction model into a model file 40.

Figure 2:
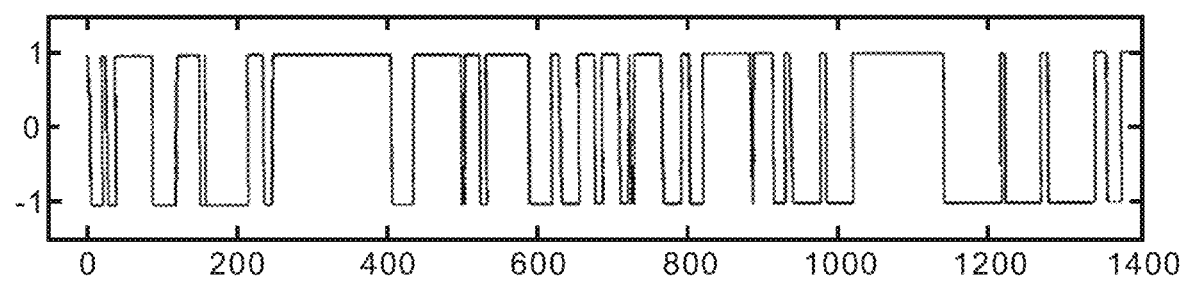
FIG. 2 shows a schematic diagram of an example of a binary random sequence signal.

In this application, the excitation signal may be a step signal or a binary random sequence signal. FIG. 2 shows a schematic diagram of an example of a binary random sequence signal. In the example shown in FIG. 2, a horizontal axis refers to a time axis in minutes, and a vertical axis is a change amplitude of a manipulated variable in units consistent with the units of the targeted manipulated variable.

In the model re-identification process shown in FIG. 1, it is necessary to carry out re-testing to re-identify the model so as to complete the adjustment of the process control prediction model, and during the re-testing period, it is necessary to add a binary random sequence signal to the process processing unit, which will cause an influence of fluctuation to a normal production process. In addition, in order to reduce the fluctuation caused by the excitation signal that is output by the identification device 10, it is necessary to reduce activation times of a re-identification mechanism, so that the process control prediction model cannot be updated in real time.

Figure 3:
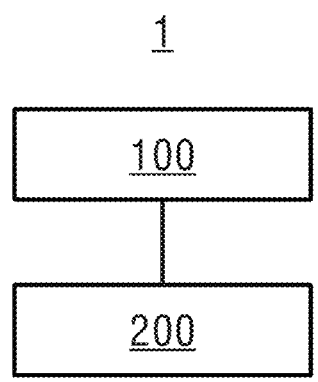
FIG. 3 shows a block diagram of a structure of a process controller according to an embodiment of the application.

FIG. 3 shows a block diagram of a structure of a process controller 1 according to an embodiment of the application. As shown in FIG. 3, the process controller 1 includes a model adjusting apparatus 100 and a process control prediction model storage apparatus 200. The model adjusting apparatus 100 is configured to adjust the process control prediction model. The process control prediction model storage apparatus 200 is configured to store the process control prediction model in the process controller for the process controller to use in process control prediction.

Figure 4:
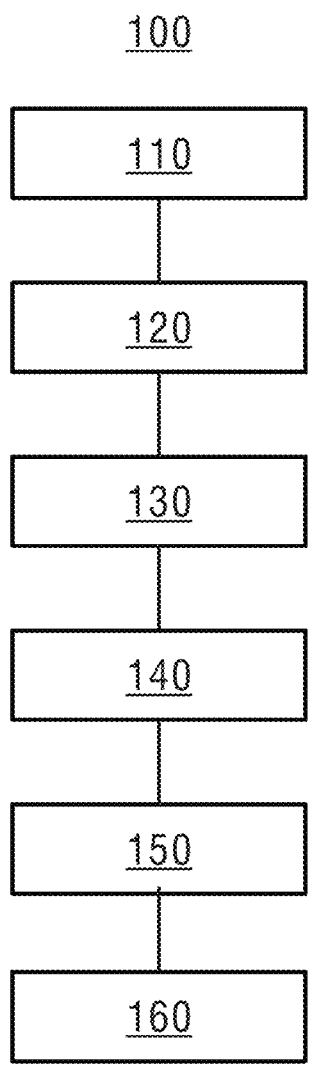
FIG. 4 shows a block diagram of an apparatus for adjusting a process control prediction model according to an embodiment of the application.

FIG. 4 shows a block diagram of the model adjusting apparatus 100 according to the embodiment of the application. As shown in FIG. 4, the model adjusting apparatus 100 includes a model adjustment trigger judging unit 110 and a model adjustment unit 130.

The model adjustment trigger judging unit 110 is configured to determine, based on controlled variable data in process control data obtained through real-time monitoring, whether a prediction performance of the process control prediction model is lower than a reference performance. For example, the process control data may be obtained by performing real-time monitoring on an automated control system or a similar system located at a production site. The model adjustment unit 130 is configured to, when the prediction performance is determined to be lower than the reference performance, use manipulated variable data in the process control data monitored to adjust the process control prediction model.

In this application, the process control data may include manipulated variable data, controlled variable data and disturbance variable data. The manipulated variable refers to a variable that can be directly adjusted in the process control. An adjusted value of the manipulated variable will directly affect the controlled variable. The controlled variable refers to a variable that needs to be adjusted to a specified value or region. The disturbance variable refers to those variables that are uncontrollable and have an impact on the controlled variable. In this application, the process controller monitors values of the three variables in real time, predicts a future trend of the controlled variable by using historical change trends of the three variables, and gives the adjusted value of the manipulated variable according to the future trend, thus keeping the controlled variable stable. For example, it is provided there is a heating tank, with one feeding way and one discharging way, and a discharging temperature is controlled by heating with steam. Then, a steam quantity is the manipulated variable, the discharging temperature is the controlled variable, and a feeding temperature is the disturbance variable.

In an example of this application, the prediction performance of the process control prediction model may be characterized by the standard variance of the prediction error of the controlled variable. Those skilled in the art can understand that the characterization of the prediction performance of the process control prediction model is not limited to the standard variance of the prediction error of the controlled variable. In another example of this application, the prediction performance of the process control prediction model may also be characterized by other statistical characteristics of the prediction error of the controlled variable, such as maximum, minimum, average, median, etc.

Figure 5:
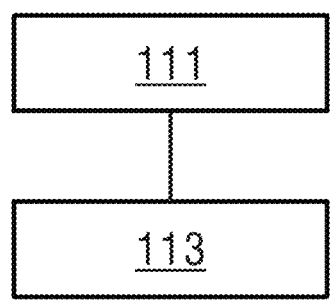
FIG. 5 shows a block diagram of a structure of an example of a model adjustment trigger judging unit in FIG. 4.

When the prediction performance of the process control prediction model may be characterized by using the standard variance of the prediction error of the controlled variable, the model adjustment trigger judging unit 110 may include a standard variance calculation module 111 and a model adjustment trigger judging module 113, as shown in FIG. 5.

Specifically, the standard variance calculation module 111 is configured to calculate the standard variance of the prediction error of the controlled variable data within a predetermined statistical period.

For example, it is provided that $t_i$ is a time point, and a statistical period is $[t_1, t_2, \ldots, t_{(n-(n-i))}, \ldots, t_n]$, wherein i=1 to n. Here, n may be set on the basis of a specific condition of the process processing unit. A predicted value of a controlled variable and an actual value of a controlled variable of an MPC controller at each time point are distributed as $Y_m(t_i)$ and $Y_m(t_i)$.

Therefore, the prediction error of the MPC controller is $e_{p_i}=Y_t(t_i)-Y_m(t_i)$, the average prediction error in the whole statistical period is $$\bar{e}_p = \frac{1}{n}\sum_{i=1}^{n} Y_t(t_i) - Y_m(t_i),$$

and the standard variance of the prediction error is $$\sigma_{e_p} = \sqrt{\frac{1}{n}\sum_{i=1}^{n}(e_{p_i} - \bar{e}_p)^2}.$$

Then, the calculated standard variance $\sigma_{e_p}$ is compared with a given threshold (i.e., the reference performance). If the calculated standard variance is greater than a reference threshold (i.e., the reference performance), the model adjustment trigger judging module 113 determines that the prediction performance is lower than the reference performance. When the model adjustment trigger judging module 113 determines that the prediction performance is lower than the reference performance, manipulated variable data in the process control data is used to adjust the process control prediction model.

In the process control, the model in the MPC controller may usually be described by different models, such as a first-order model, a second-order model or a slope model. Which model in the MPC controller is described in detail depends on characteristics of a process to be controlled. Key parameters (or transfer functions) of the above models include a Gain, a steady-state time τ and a dead time d. In the three key parameters above, a most common model mismatch situation is Gain mismatch, for example, the Gain mismatch caused by engineering load changes. Therefore, the adjustment carried out on the process control prediction model in the MPC controller refers to the adjustment on the parameter Gain in the process control prediction model.

A principle of adjusting the parameter Gain in the process control prediction model will be explained below.

With respect to the MPC controller, it is assumed that T is a control period, and a value of a manipulated variable MV changes once in each control period, for example, an input value Mi of a new manipulated variable MV is obtained after changing the manipulated variable MV by one step size (i.e., step amplitude), wherein i is a serial number of the control period. Therefore, the input of the manipulated variable of the process controller in a frequency domain may be expressed as:

$$R(s) = \frac{Mi}{s} \qquad \text{Equation (1)}$$

Assuming that the process control prediction model in the process controller is a first-order model with time delay, then a transfer function is:

$$G(s) = \frac{G_t}{\tau s + 1} \cdot e^{-ds} \qquad \text{Equation (2)}$$

If the process control prediction model has a gain error $E_g$, then:

$$\text{Gain}=G_t+E_g \qquad \text{Equation (3)}$$

wherein, $G_t$ is a true gain value of the process control prediction model and $E_g$ is the gain error.

A predicted output value of the process controller under a mismatch prediction model (i.e., the current prediction model) is:

$$Y_m(s) = R(s)G(s) = \frac{Mi}{s} \cdot \frac{G_t + E_g}{\tau s + 1} \cdot e^{-ds} \qquad \text{Equation (4)}$$

and, an actual output value is:

$$Y_t(s) = R(s)G(s) = \frac{Mi}{s} \cdot \frac{G_t}{\tau s + 1} \cdot e^{-ds} \qquad \text{Equation (5)}$$

By transforming the above equations (4) and (5) from a frequency domain to a time domain, the followings will be got:

$$Y_m(t) = Mi \cdot (G_t + E_g) \cdot e^{\frac{t-d}{\tau}}, \qquad \text{Equation (6)}$$

and

-continued $$Y_t(t) = Mi \cdot G_t \cdot e^{\frac{t-d}{\tau}} \quad \text{Equation (7)}$$

It can be concluded from the above equations (6) and (7) that:

$$E_g = \frac{(Y_m(t) - Y_t(t))}{Mi \cdot e^{\frac{t-d}{\tau}}} \quad \text{Equation (8)}$$

It can be seen from the above that $\tau$ is the steady-state time of the current process control prediction model, d is the dead time of the current process control prediction model, Mi is the input value of the adjusted manipulated variable, $Y_m(t)$ is the predicted output value which is predicted based on the current process control prediction model when the manipulated variable is input by Mi, and $Y_t(t)$ is the actual output value after time t elapses in the case where the manipulated variable is input by Mi. Therefore, the gain error $E_g$ in the process control prediction model can be calculated by obtaining each value in Equation (8), and then the gain parameters in the adjusted process control prediction model can be obtained, thus realizing the adjustment of the process control prediction model.

Figure 6:
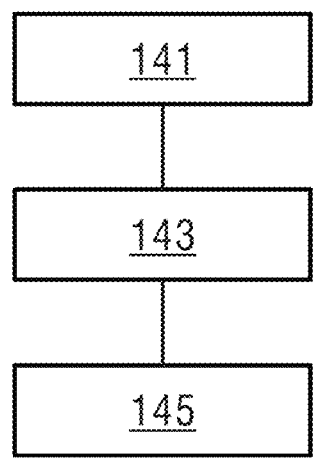
FIG. 6 shows a block diagram of a structure of an example of a model adjustment unit in FIG. 4.

FIG. 6 shows a block diagram of a structure of an example of a model adjustment unit 140 in FIG. 4. As shown in FIG. 6, the model adjustment unit 140 may include a controlled variable prediction data acquisition module 141, a controlled variable actual data acquisition module 143, and a model parameter adjustment module 145.

The controlled variable prediction data acquisition module 141 is configured to acquire controlled variable prediction data after a specified period predicted by the current process control prediction model under the condition of given manipulated variable data. The controlled variable actual data acquisition module 143 is configured to acquire controlled variable actual data after the specified period under the condition of the given manipulated variable data. The model parameter adjustment module 145 is configured to, based on the given manipulated variable data, the acquired controlled variable prediction data and the acquired controlled variable actual data, adjust parameters of the current process control prediction model. Specifically, the model parameter adjustment module 145, based on the given manipulated variable data, the acquired controlled variable prediction data and the acquired controlled variable actual data, calculates the gain error of the gain parameter of the process control prediction model, and then determines the gain parameter of the adjusted process control prediction model by using the gain error of the gain parameter calculated.

Moreover, in another example of this application, the process control data may further include disturbance variable data. The model adjusting apparatus 100 may further include a suitable data statistical period determining unit 120 and a manipulated variable data selecting unit 130. When the prediction performance is determined to be lower than the reference performance, the suitable data statistical period determining unit 120 uses the manipulated variable data and the disturbance variable data in the process control data monitored to determine a process control data statistical period suitable for adjusting the process control prediction model. Then, the manipulated variable data selecting unit 130 selects the given manipulated variable data from the determined process control data statistical period.

Specifically, the suitable data statistical period determining unit 120, based on MV data and DV data in the monitored process control data, evaluates a current state of the MPC controller. Specifically, standard variances $\sigma_{MV}$ and $\sigma_{DV}$ of the MV data and the DV data in the last n minutes are calculated, and then the calculated standard variances $\sigma_{MV}$ and $\sigma_{DV}$ are compared with pre-created criteria $\hat{\sigma}_{MV}$ and $\hat{\sigma}_{DV}$. Here, the pre-created criteria $\hat{\sigma}_{MV}$ and $\hat{\sigma}_{DV}$ are created by analyzing historical data, and the historical data may include CV data, the MV data, the DV data and some other information, such as factory load, temperature, etc.

If the above comparison satisfies a predetermined condition, wherein the predetermined condition refers to a condition that a current working condition belongs to a normal working condition, for example, the predetermined condition may be $\sigma_{MV} < 30\% \times \hat{\sigma}_{MV}$ and $\sigma_{DV} < 30\% \times \hat{\sigma}_{DV}$. Then, the manipulated variable data selecting unit 130 selects the given manipulated variable data from the determined process control data statistical period, and then the model adjustment unit 140, based on the selected given manipulated variable data, adjust the process control prediction model. Otherwise, a current statistical period is discarded, that is, a data segment between a current time point and a starting point of the statistical period is discarded, and the current point is taken as a new starting point to continue the statistics (for example, data of a predetermined period may be continuously counted), and the suitable data statistical period determining unit 120, based on the newly counted data, determines whether the process control data statistical period is suitable for adjusting the process control prediction model.

The model adjusting apparatus 100 may further include a model updating unit 160. The model updating unit 160 is configured to, after obtaining the adjusted process control prediction model as described above, use the adjusted process control prediction model to update the process control prediction model in a process control prediction model storage device.

Moreover, optionally, the model adjusting apparatus 100 may further include a model verification unit 150. The model verification unit 150 is configured to, before the using the adjusted process control prediction model to update the process control prediction model in the process controller, verify the prediction performance of the adjusted process control prediction model.

Specifically, the model verification unit 150 inputs the same manipulated variable value into the original process control prediction model and the adjusted process control prediction model, and based on the original process control prediction model and the adjusted process control prediction model, calculates respective predicted values of the controlled variables, so as to obtain respective controlled variable prediction errors. Then, the model verification unit 150 calculates standard variances of the controlled variable prediction errors under each model, and based on the two standard variances of the prediction errors calculated, judges whether a prediction performance improvement of the adjusted process control prediction model exceeds a predetermined threshold. For example, it is determined whether the prediction performance improvement exceeds the predetermined threshold by calculating whether $(\sigma_{e_p} - \sigma'_{e_p})/\sigma_{e_p} \times 100\%$ is greater than the predetermined threshold. If it is judged that the prediction performance improvement of the adjusted process control prediction model exceeds the predetermined threshold, then the model verification unit 150 determines that the prediction performance passes verification. Otherwise, the model verification unit 150 determines that the prediction performance fails verification.

When the model verification unit 150 determines that the prediction performance fails verification, the model adjustment unit 140 re-adjusts the process control prediction model. When the model verification unit 150 determines that the prediction performance passes verification, the model updating unit 160 uses the adjusted process control prediction model to update the process control prediction model in the process controller.

The apparatus for adjusting a process control prediction model and the process controller having the apparatus according to the application are described above with reference to FIGS. 3 to 6, and a method for adjusting a process control prediction model according to the application is described below with reference to FIGS. 7 to 9.

Figure 7:
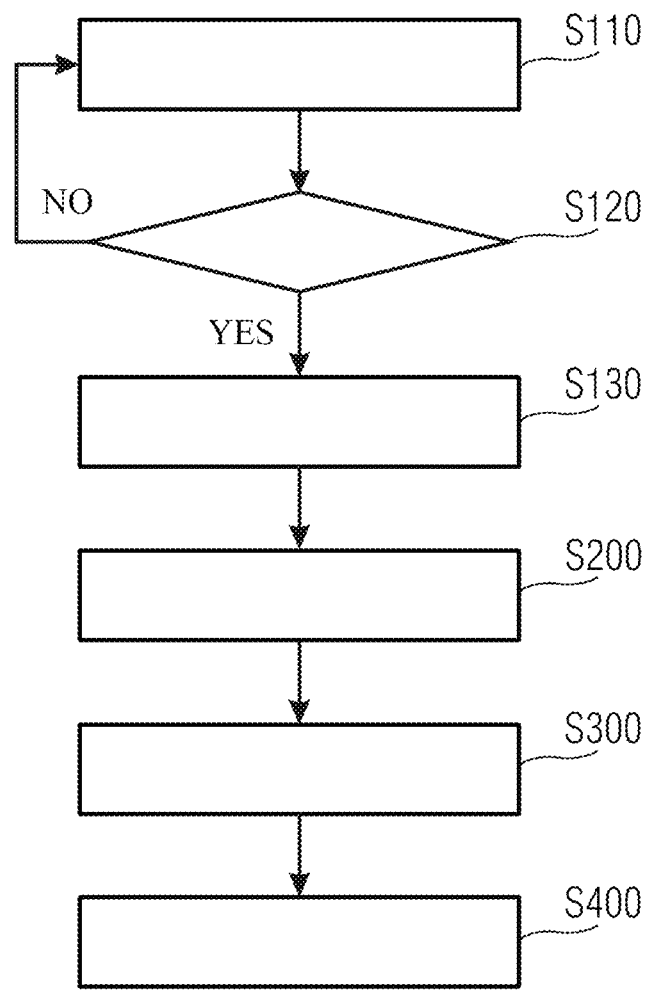
FIG. 7 shows a flow chart of a method for adjusting a process control prediction model according to an embodiment of the application.

FIG. 7 shows a flow chart of a method for adjusting a process control prediction model according to an embodiment of the application.

As shown in FIG. 7, in block S110, process control data is obtained through real-time monitoring. For example, an automated control system or similar system located at a production site is monitored in real time to obtain the process control data. Then, in block S120, based on controlled variable data in the process control data monitored, it is determined whether a prediction performance of the process control prediction model is lower than a reference performance. If the prediction performance is determined to be lower than the reference performance, then an operation of block S130 is performed. If the prediction performance is determined to be not lower than the reference performance, return to block S110, and continuously monitor the automated control system. Refer to the operations of the model adjustment trigger judging unit 110 described above with reference to FIG. 4 for operations of block S110 and block S120.

Next, in block S130, manipulated variable data and disturbance variable data in the process control data monitored are used to determine a process control data statistical period suitable for adjusting the process control prediction model. Refer to the operations of the suitable data statistical period determining unit 120 described above with reference to FIG. 4 for operations of block S130.

Then, in block S200, the manipulated variable data in the process control data monitored is used to adjust the process control prediction model. Refer to the operations of the manipulated variable data selecting unit 130 and the model adjustment unit 140 described above with reference to FIG. 4 for operations of block S200.

Figure 8:
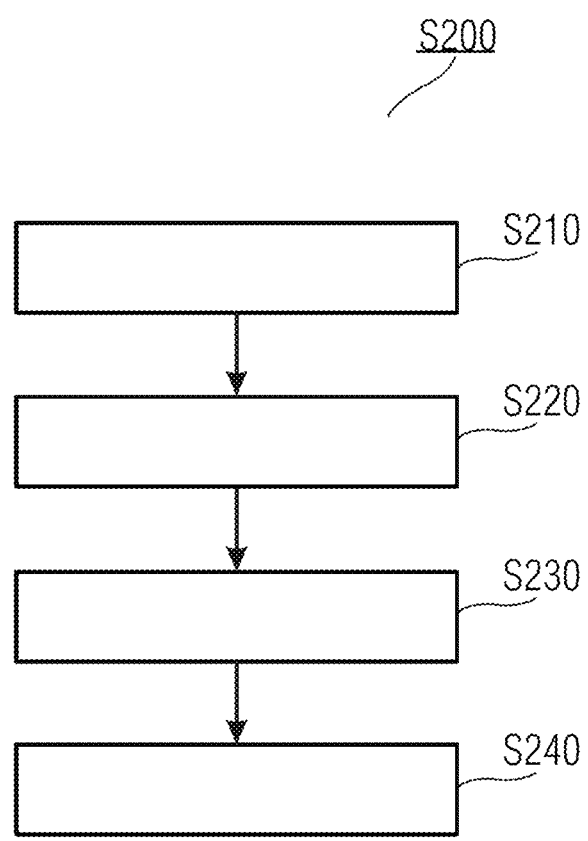
FIG. 8 shows a flow chart of an example of a process for adjusting a process control prediction model in FIG. 7.

FIG. 8 shows a flow chart of an example of a process for adjusting a process control prediction model in FIG. 7.

As shown in FIG. 8, in block S210, the manipulated variable data for adjusting the process control prediction model is selected from the process control data statistical period determined. Refer to the operations of the manipulated variable data selecting unit 130 described above with reference to FIG. 4 for operations of block S210.

In block S220, controlled variable prediction data after a specified period predicted by the current process control prediction model under the condition of selected manipulated variable data is acquired. Refer to the operations of the controlled variable prediction data acquisition module 141 described above with reference to FIG. 5 for operations of block S220.

Next, in block S230, the controlled variable actual data after the specified period under the condition of selected manipulated variable data is acquired. Refer to the operations of the controlled variable actual data acquisition module 143 described above with reference to FIG. 5 for operations of block S230.

Then, in block S240, based on the manipulated variable data, the acquired controlled variable prediction data and the acquired controlled variable actual data, parameters of the current process control prediction model are adjusted. Refer to the operations of the model parameter adjustment module 145 described above with reference to FIG. 5 for operations of block S240.

After the process control prediction model is adjusted as above, in block S300, the adjusted process control prediction model is verified. Refer to the operations of the model verification unit 150 described above with reference to FIG. 4 for operations of block S300.

Figure 9:
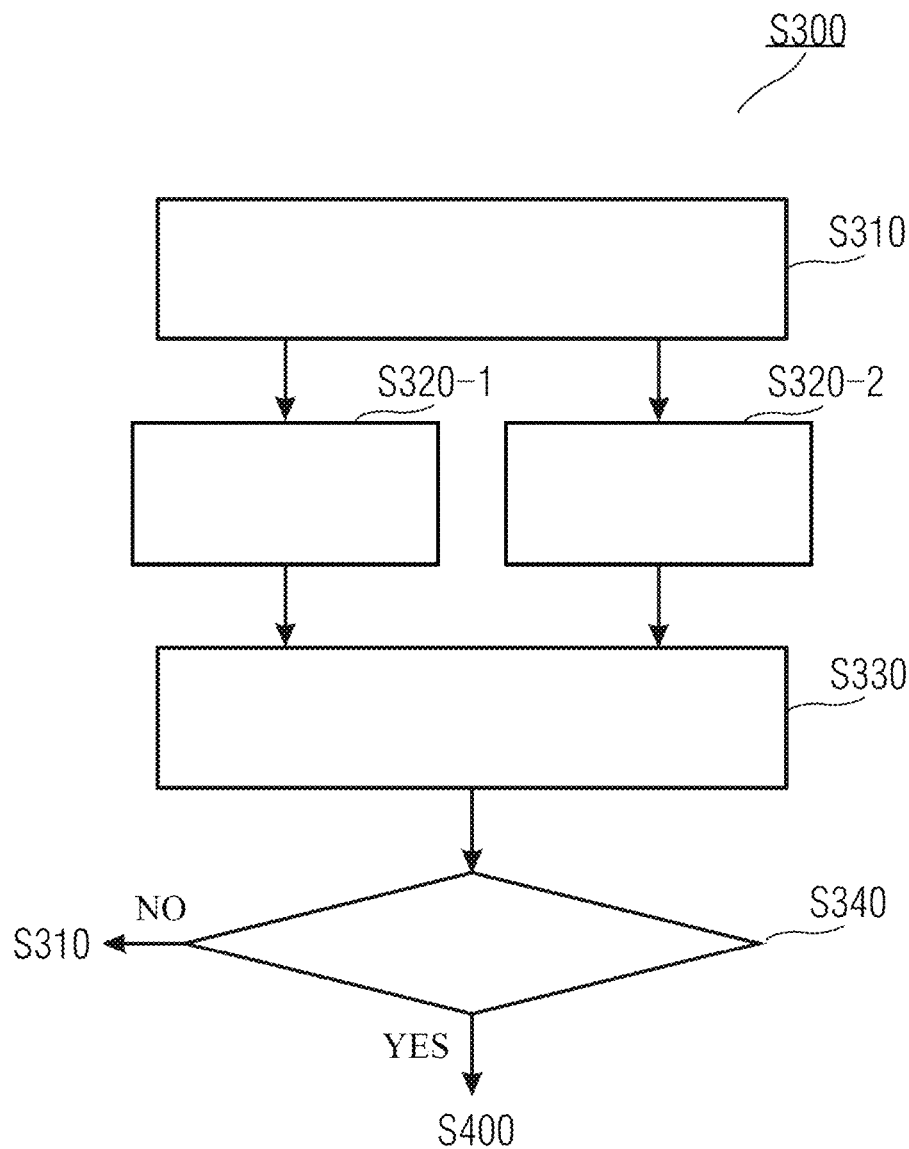
FIG. 9 shows a flow chart of an example of a process for verifying the process control prediction model adjusted in FIG. 7.

FIG. 9 shows a flow chart of an example of a process for verifying the process control prediction model adjusted in FIG. 7.

As shown in FIG. 9, in block S310, the model verification unit 150 inputs the same manipulated variable value into the original process control prediction model and the adjusted process control prediction model, and then in block S320-1 and block S320-2, based on the original process control prediction model and the adjusted process control prediction model, calculates respective predicted values of the controlled variables, so as to obtain respective controlled variable prediction errors. Then, in block S330, standard variances of the controlled variable prediction errors under each model are calculated, and in block S340, based on the two standard variances of the prediction errors calculated, it is judged whether a prediction performance improvement of the adjusted process control prediction model exceeds a predetermined threshold. For example, it is determined whether the prediction performance improvement exceeds the predetermined threshold by calculating whether $(\sigma_{e_p} - \sigma'_{e_p})/\sigma_{e_p} \times 100\%$ is greater than the predetermined threshold. If it is judged that the prediction performance improvement of the adjusted process control prediction model exceeds the predetermined threshold, then it is determined that the prediction performance passes verification, and the flow proceeds to operations of block S400. Otherwise, it is determined that the prediction performance fails verification, and the flow returns to the operations of block S130, to continuously adjust the process control prediction model.

After it is determined that the prediction performance passes verification as described above, in block S400, the adjusted process control prediction model is used to update the process control prediction model in the process controller, that is, the process control prediction model in a process control prediction model data storage device, for subsequent use by the process controller.

It should be noted here that the operations of block S130 described above are optional operations. In some implementations of the application, the operations of block S130 may be unnecessary. Accordingly, the operations of block S210 are also unnecessary. Similarly, the operations of blocks S300 and S400 described above are also optional operations.

Figure 10:
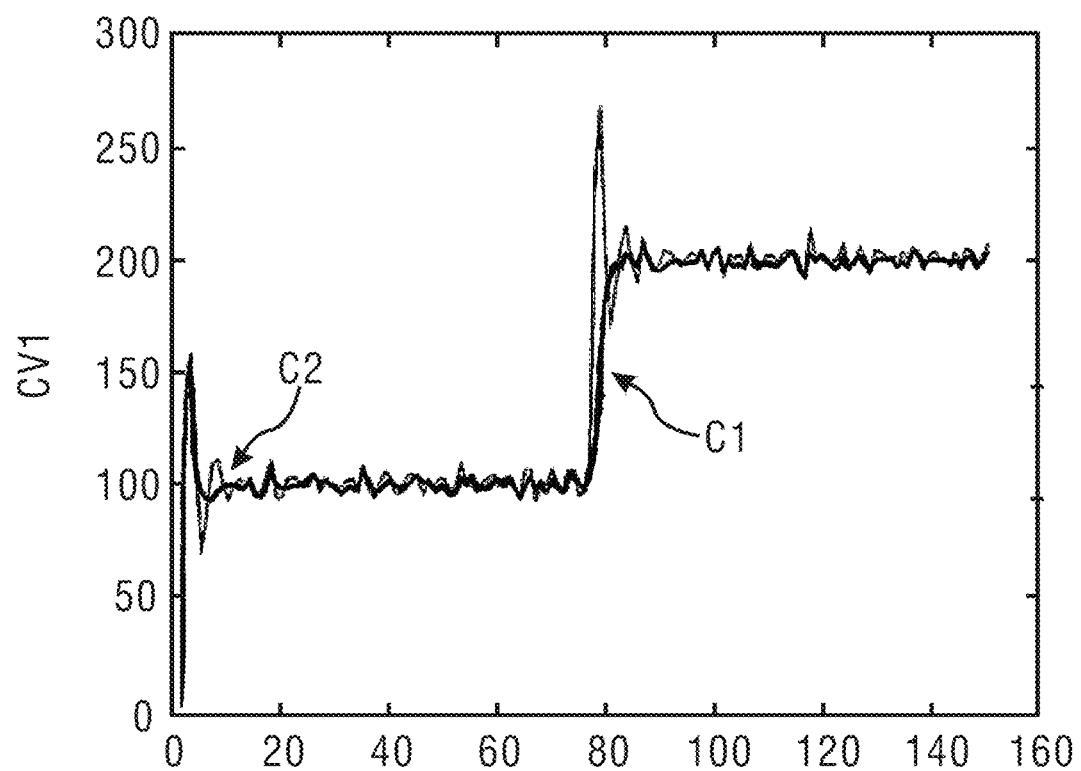
FIG. 10 shows a performance comparison diagram of a process controller adjusted by the process control prediction model according to an embodiment of the application and a process controller in the prior art.

FIG. 10 shows a performance comparison diagram of a process controller adjusted by the process control prediction model according to the application and a process controller in the prior art.

In the performance simulation shown in FIG. 10, the solutions according to the application are implemented by using a two-input (MV1 and MV2) two-output (CV1 and CV2) system, wherein there is a high mismatch (400%) in a gain value of a model between the MV1 and the CV1. In addition, in order to simulate an actual environment while proving a robustness of the solutions according to the application, a gain value of a model between the MV2 and the CV1 is also set to have a small mismatch (20%).

The above simulation is implemented in Simulink/Matlab. A control point of the CV1 is switched from 0 to 100 at a time point 0 and switched from 100 to 200 at a time point 75. A comparison of controller performances is shown in FIG. 10, wherein a curve C1 represents a performance curve of the process controller after the process control prediction model is adjusted, and a curve C2 represents a performance curve of the process controller in the prior art.

It can be seen from FIG. 10 that the curve C2 has a very large overshoot (overshoot) after two switches and has a rather long steady-state time, and the overshoot and the steady-state time mentioned above are caused by model mismatch. However, in the curve C1, the mismatched model may be adjusted at the beginning of switching the CV control point for the first time, and has satisfactory performances at the second switched point (i.e., after the adjusted prediction model is adjusted by overshoot).

With reference to FIGS. 3 to 10 above, embodiments of the method for adjusting a process control prediction model, the model adjusting apparatus, and the process controller having the apparatus according to the application are described. The model adjusting apparatus above may be implemented in the form of hardware, or in the form of software, or a combination of hardware and software.

Figure 11:
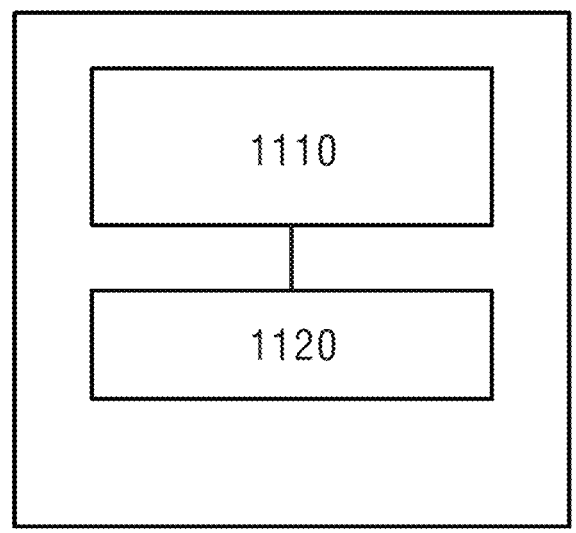
FIG. 11 shows a block diagram of a computing device for adjusting a process control prediction model according to an embodiment of the application.

In this application, the model adjusting apparatus 100 may be implemented by using a computing device. FIG. 11 shows a block diagram of a computing device 1100 for adjusting a process control prediction model according to the application. According to one embodiment, the computing device 1100 may include a processor 1110. The processor 1110 executes one or more computer-readable instructions (i.e., the above-described elements implemented in the form of software form) stored or encoded in a computer-readable storage medium (i.e., memory 1120).

In one embodiment, the memory 1120 stores the computer-executable instruction which, when executed, causes one or more processors 1110 to: based on controlled variable data process control data obtained through real-time monitoring, determine whether a prediction performance of the process control prediction model is lower than a reference performance; and when the prediction performance is lower than the reference performance, use manipulated variable data in the process control data monitored to adjust the process control prediction model.

It should be understood that the memory 1120 stores the computer-executable instruction which, when executed, causes the one or more processors 1110 to perform the various operations and functions described above with reference to FIGS. 3 to 10 in various embodiments of the application.

According to one embodiment, there is provided a program product such as a non-transitory machine-readable medium. The non-transitory machine-readable medium may have an instruction (i.e., the above-described element implemented in the form of software) which, when executed by the machine, cause the machines to perform various operations and functions described above with reference to FIGS. 3 to 10 in various embodiments of the application.

Exemplary embodiments are described above in combination with specific implementations illustrated in the accompanying drawings, but this does not represent all embodiments that may be implemented or fall within the protection scope of the claims. A term "exemplary" used in the entire specification means "used as an example, an instance, or an illustration", and does not mean "preferred" or "superior" over other embodiments. To provide an understanding of the described technologies, the specific implementations include specific details. However, these technologies may be implemented without these specific details. In some embodiments, to avoid confusing the concept of the described embodiments, a well-known structure and apparatus are shown in a block diagram form.

The descriptions of the content of the present disclosure are provided to allow any person of ordinary skill in the art to implement or use the content of the present disclosure. For a person of ordinary skill in the art, various modifications on the content of the present disclosure are obvious. In addition, a general principle defined in this specification may be applied to other variants without departing from the protection scope of the content of the present disclosure. Therefore, the content of the present disclosure is not limited to the examples and designs described in this specification, but is consistent with the widest range conforming to the principle and novelty disclosed in this specification.

What is claimed is:

1. A method for adjusting a process control prediction model, the method comprising:
    obtaining process control data through real-time monitoring, the process control data including controlled variable data and manipulated variable data;
    determining whether a prediction performance of the process control prediction model is lower than a reference performance, based on the controlled variable data;
    first adjusting the process control prediction model by using the manipulated variable data in the process control data, in response to determining the prediction performance to be lower than the reference performance;
    predicting, by the process control prediction model under a condition of the manipulated variable data, a specified period;
    acquiring controlled variable prediction data after the specified period;
    acquiring controlled variable actual data after the specified period; and
    second adjusting the process control prediction model based on the manipulated variable data, the controlled variable prediction data acquired and the controlled variable actual data.

2. The method of claim 1, wherein the determining whether the prediction performance of the process control prediction model is lower than the reference performance, comprises:
    calculating a standard variance of a prediction error of the controlled variable data within a statistical period; and
    determining that the prediction performance is lower than the reference performance in response to the standard variance being greater than a reference threshold.

3. The method of claim 2, wherein the process control data further comprises disturbance variable data, and wherein the method further comprises:
    determining a process control data statistical period suitable for adjusting the process control prediction model by monitoring the manipulated variable data and the disturbance variable data in the process control data; and
    selecting the manipulated variable data from the process control data statistical period.

4. The method of claim 1, wherein the process control data further comprises disturbance variable data, and wherein the method further comprises:
- determining a process control data statistical period suitable for adjusting the process control prediction model by monitoring the manipulated variable data and the disturbance variable data in the process control data; and
- selecting the manipulated variable data from the process control data statistical period.

5. The method of claim 4, wherein parameters of the process control prediction model comprise a gain, a steady-state time, and a dead time, and
- wherein the second adjusting includes adjusting the gain.

6. The method of claim 1, further comprising:
- updating the process control prediction model in a process controller based on an adjusted process control prediction model resulting from the second adjusting.

7. The method of claim 6, wherein, the updating the process control prediction model in the process controller further comprises:
- verifying the prediction performance of the adjusted process control prediction model,
- re-adjusting the adjusted process control prediction model in response to the verifying indicating that a prediction performance improvement degree of the adjusted process control prediction model does not exceed a threshold, and
- updating the process control prediction model in the process controller with the adjusted process control prediction model in response to the verifying indicating that the prediction performance improvement degree of the adjusted process control prediction model exceeds the threshold.

8. A non-transitory machine-readable storage medium storing an executable instruction which, when executed by a machine, causes the machine to perform the method of claim 1.

9. An apparatus for adjusting a process control prediction model, comprising:
- one or more processors configured to cause the apparatus to
  - obtain process control data through real-time monitoring, the process control data including controlled variable data and manipulated variable data,
  - determine whether a prediction performance of the process control prediction model is lower than a reference performance, based on the controlled variable data,
  - first adjust the process control prediction model by using the manipulated variable data in the process control data, in response to determining the prediction performance to be lower than the reference performance,
  - predict, via the process control prediction model under a condition of the manipulated variable data, a specified period,
  - acquire controlled variable prediction data after the specified period,
  - acquire controlled variable actual data after the specified period, and
  - second adjust the process control prediction model based on the manipulated variable data, the controlled variable prediction data acquired and the controlled variable actual data.

10. The apparatus of claim 9, wherein the one or more processors are further configured to cause the apparatus to:
- determine whether the prediction performance of the process control prediction model is lower than the reference performance by
  - calculating a standard variance of a prediction error of the controlled variable data within a statistical period, and
  - determining that the prediction performance is lower than the reference performance in response to the standard variance being greater than a reference threshold.

11. The apparatus of claim 9, wherein the process control data further comprises disturbance variable data, and wherein the one or more processor are further configured to cause the apparatus to:
- determine a process control data statistical period suitable for adjusting the process control prediction model by monitoring the manipulated variable data and the disturbance variable data in the process control data; and
- the manipulated variable data from the process control data statistical period.

12. The apparatus of claim 11, wherein parameters of the process control prediction model comprise a gain, a steady-state time and a dead time, and
wherein the one or more processors are further configured to cause the apparatus to:
- second adjust the process control prediction model by adjusting the gain.

13. The apparatus of claim 9, further comprising:
- a process controller,
- wherein the one or more processors are further configured to cause the apparatus to
- update a process control prediction model in the process controller.

14. The apparatus of claim 13, wherein the one or more processors are further configured to cause the apparatus to:
- update the process control prediction model in the process controller by,
  - verifying the prediction performance of an adjusted process control prediction model resulting from the second adjust,
  - re-adjusting the adjusted process control prediction model in response to the verifying indicating that a prediction performance improvement degree of the adjusted process control prediction model does not exceed a threshold, and
  - updating the process control prediction model in the process controller with the adjusted process control prediction model in response to the verifying that prediction performance improvement degree of the adjusted process control prediction model exceeds the threshold.

15. A process controller, comprising:
- the apparatus of claim 9; and
- a process control prediction model storage apparatus configured to store a process control prediction model.

16. A computing device, comprising:
- one or more processors; and
- a memory coupled with the one or more processors, and configured to store an instruction which, when executed by the one or more processors, causes the one or more processors to
  - obtain process control data through real-time monitoring, the process control data including controlled variable data and manipulated variable data, determine whether a prediction performance of a process control prediction model is lower than a reference performance, based on the controlled variable data, first adjust the process control prediction model by using the manipulated variable data in the process control data, in response to determining the prediction performance to be lower than the reference performance, predict, via the process control prediction model under a condition of the manipulated variable data, a specified period, acquire controlled variable prediction data after the specified period, acquire controlled variable actual data after the specified period, and second adjust the process control prediction model based on the manipulated variable data, the controlled variable prediction data acquired and the controlled variable actual data.

* * * * *